(12) United States Patent
Stern et al.

(10) Patent No.: US 9,022,250 B2
(45) Date of Patent: May 5, 2015

(54) TILTED SENSORY AROMA GLASS

(71) Applicant: E. & J. Gallo Winery, Modesto, CA (US)

(72) Inventors: Lewis Stern, Modesto, CA (US); Meara Kelley, Modesto, CA (US); Tim Ryan, Modesto, CA (US)

(73) Assignee: E. & J. Gallo Winery, Modesto, CA (US)

( * ) Notice: Subject to any disclaimer, the term of this patent is extended or adjusted under 35 U.S.C. 154(b) by 0 days.

(21) Appl. No.: 14/033,288

(22) Filed: Sep. 20, 2013

(65) Prior Publication Data

US 2014/0021211 A1    Jan. 23, 2014

Related U.S. Application Data

(63) Continuation-in-part of application No. 13/610,793, filed on Sep. 11, 2012, which is a continuation of application No. 12/618,455, filed on Nov. 13, 2009, now Pat. No. 8,281,954.

(51) Int. Cl.
*B65D 25/00* (2006.01)
*A47G 19/22* (2006.01)
*B67D 3/00* (2006.01)

(52) U.S. Cl.
CPC .......... *A47G 19/2255* (2013.01); *B67D 3/0061* (2013.01); *A47G 19/2205* (2013.01); *A47G 2400/045* (2013.01)

(58) Field of Classification Search
USPC .......................... 220/703, 711, 712, 719, 745
See application file for complete search history.

(56) References Cited

U.S. PATENT DOCUMENTS

| | | | | |
|---|---|---|---|---|
| 2,810,491 A | * | 10/1957 | Goldschmidt | 220/501 |
| 3,781,164 A | * | 12/1973 | McCaffery | 431/291 |
| 5,720,412 A | | 2/1998 | Ficken | |
| 5,758,797 A | * | 6/1998 | Martindale | 220/719 |
| 5,971,202 A | * | 10/1999 | Filbrun | 220/719 |
| 6,277,422 B1 | * | 8/2001 | Gale | 426/115 |
| 6,446,827 B1 | * | 9/2002 | Akins | 220/570 |
| 2004/0099544 A1 | * | 5/2004 | Ness et al. | 206/216 |
| 2005/0103794 A1 | * | 5/2005 | Liu | 220/703 |
| 2006/0163251 A1 | * | 7/2006 | Kelstrom et al. | 220/253 |
| 2007/0181591 A1 | * | 8/2007 | Pierce et al. | 220/801 |
| 2007/0228044 A1 | * | 10/2007 | Rago | 220/359.1 |
| 2007/0228054 A1 | * | 10/2007 | Woodhouse | 220/719 |
| 2008/0023348 A1 | * | 1/2008 | Herzog et al. | 206/217 |
| 2008/0179276 A1 | | 7/2008 | Lohrman et al. | |

* cited by examiner

*Primary Examiner* — Steven A. Reynolds
*Assistant Examiner* — King M Chu
(74) *Attorney, Agent, or Firm* — Steptoe & Johnson LLP

(57) ABSTRACT

A tilted sensory aroma glass is disclosed. According to one embodiment, an apparatus includes a fluid container having a rim and a base. The base is parallel to and in contact with a surface when the fluid container is placed on the surface. The rim and the base lie on intersecting planes. The apparatus further includes a fluid barrier having an opening. The fluid barrier is in contact with the fluid container and extends into the fluid container. The opening is configured to allow an aroma of a fluid in the fluid container to escape through the opening. The aroma glass allows consumers to view and smell the liquid contents of the aroma glass, but prevents consumers from consuming the liquid contents.

17 Claims, 10 Drawing Sheets

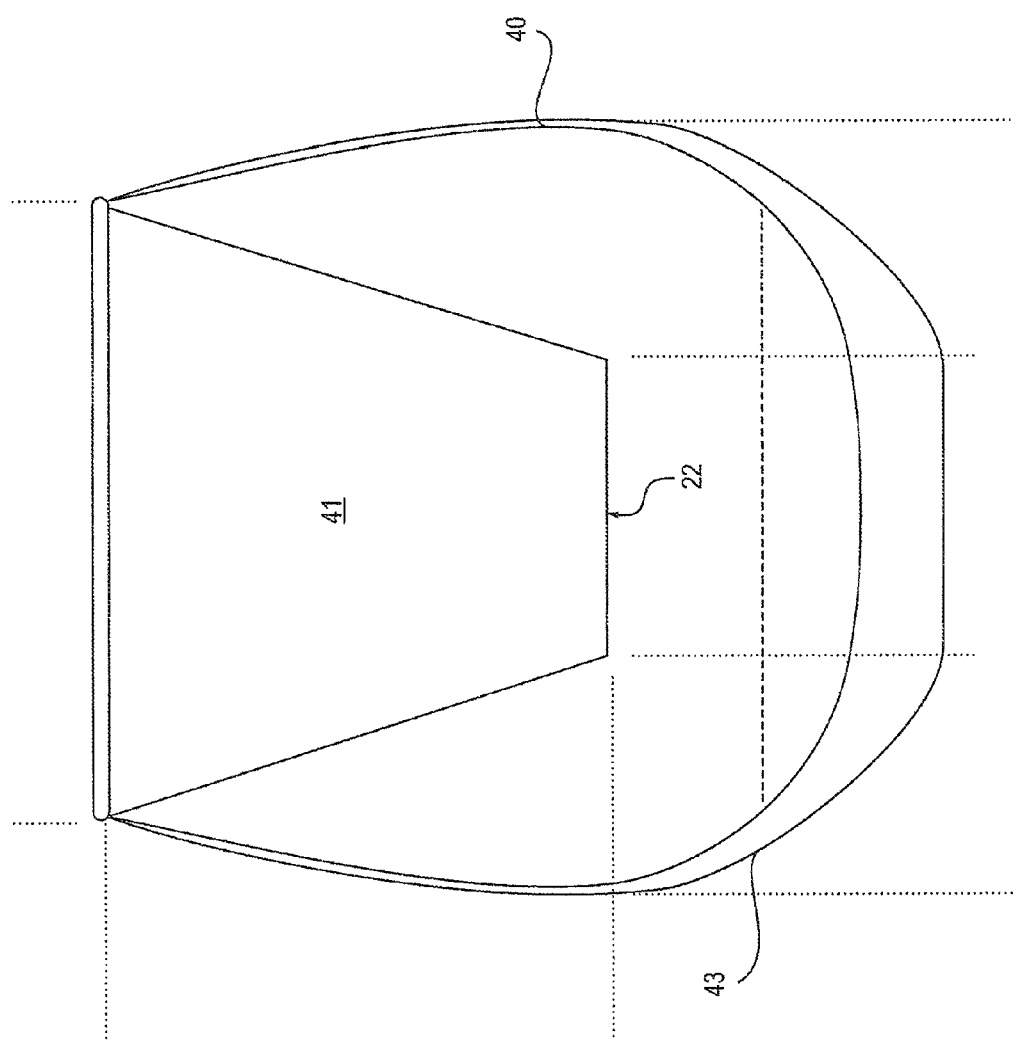

TILTED SENSORY AROMA GLASS

The present application is a continuation-in-part of U.S. patent application Ser. No. 13/610,793 entitled "Sensory Aroma Glass", filed on Sep. 11, 2012, which is a continuation of U.S. patent application Ser. No. 12/618,455 entitled "Sensory Aroma Glass", filed on Nov. 13, 2009, the disclosures of which are incorporated by reference in their entirety, for all purposes, herein.

FIELD

The present disclosure relates to a container for fluids. In particular, the present apparatus and methods are directed to a sensory aroma glass.

BACKGROUND

Prior devices include a variety of drinking vessels that allow for improved olfaction from the vessel during consumption of a beverage, and vessel covers which prevent insects from contacting the liquid contents.

One prior device is a drinking glass having the dual purpose of providing, in addition to drinking therefrom, the ability to sample the aroma emitted from the beverage. The device has at least one inner element inside the drinking glass dividing the glass into a drinking compartment and an aroma compartment. This allows the aroma of the beverage to be sampled from the aroma compartment while consuming the beverage from the drinking compartment.

Another prior device is a drinking glass which allows for improved olfaction from the glass in addition to drinking therefrom. The rim of the glass has a cut-out section to create a facial profile to receive the nose.

Another prior device is a cover for a container which will allow liquid contents to exit while preventing intrusion of insects. The cover has a plastic screen which is attachable and detachable from the upper rim of the container.

Another prior device has an improved cover for a container which allows liquid contents to exit while preventing the intrusion of insects. The cover has an annular guard formed with a downwardly extending skirt and an orthogonally upwardly positioned rim including a screen matrix tapering downwardly to meter flow of beverage through the openings.

SUMMARY

A tilted sensory aroma glass is disclosed. According to one embodiment, an apparatus includes a fluid container having a rim and a base. The base is parallel to and in contact with a surface when the fluid container is placed on the surface. The rim and the base lie on intersecting planes. The apparatus further includes a fluid barrier having an opening. The fluid barrier is in contact with the fluid container and extends into the fluid container. The opening is configured to allow an aroma of a fluid in the fluid container to escape through the opening.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiments of the present disclosure and together with the general description given above and the detailed description of the preferred embodiments given below serve to explain and teach the principles described herein.

FIG. 1A illustrates a side view of a sensory aroma glass, according to one embodiment;

Figure 1B:
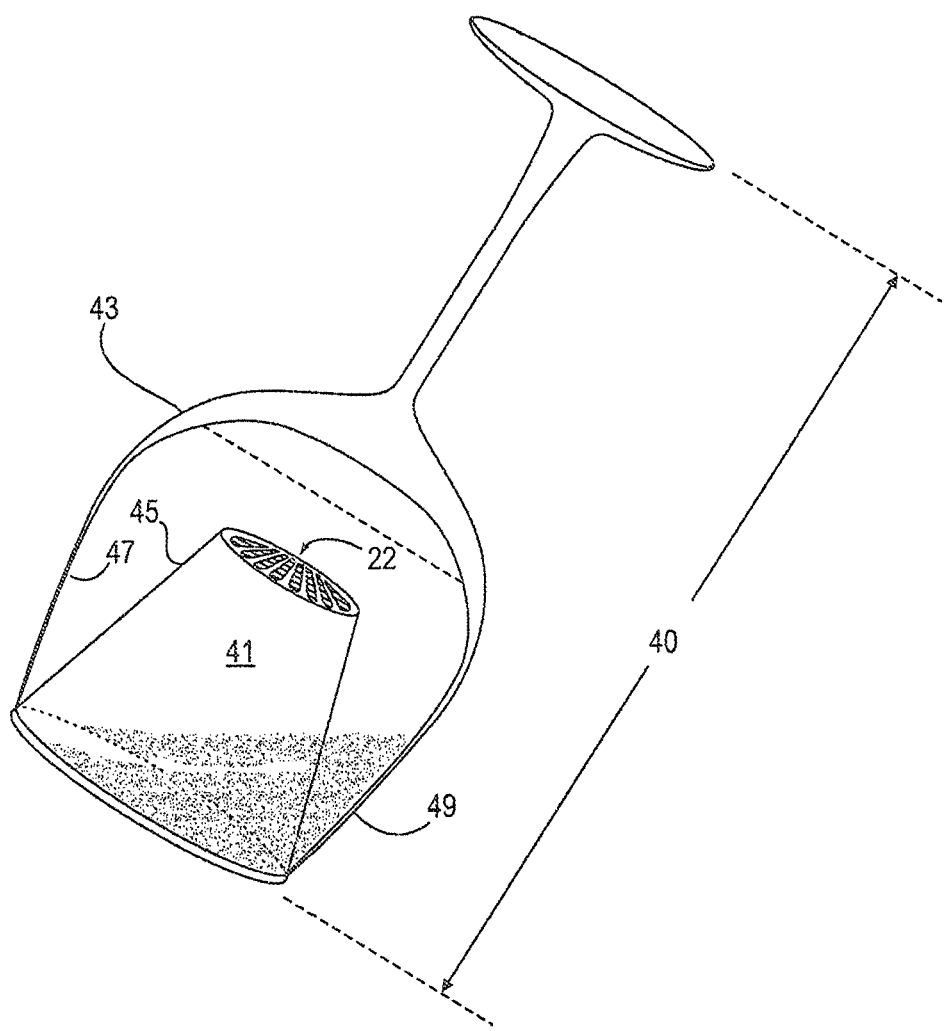
FIG. 1B illustrates a perspective view of a sensory aroma glass in practice, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A promotional tool in the form of a drinking glass with a barrier that allows consumers to view and smell the liquid contents of the glass, but prevents consumers from consuming the liquid contents. The fluid container has the shape and appearance of a conventional glass but has a unique conical barrier which prevents consumption of any liquid contents.

Three important aspects of initial purchase and repeat purchase of wine, spirit, and malt beverages are the product appearance, aroma and taste. When promoting such beverages, there may be instances where it is desirable to allow consumers to both view the beverage and sample its aroma, while preventing the consumer from actually tasting or consuming the beverage. Case examples where such a promotional tool is useful include states where tasting/sampling of alcoholic beverages is subject to regulatory constraints, or instances where the promotion location is not zoned/licensed for sale/consumption of alcoholic beverages.

According to one embodiment, the present apparatus provides a fluid container manufactured with a fluid barrier which prevents the beverage from escaping or being extracted, while permitting the aroma of the beverage to pass through. The interior of the fluid container manufactured with a conical barrier.

According to one embodiment, the present apparatus provides a reusable fluid container and fluid barrier set which prevents the beverage from escaping or being extracted while permitting only the aroma of the beverage to pass through. The fluid barrier being attachable and detachable from the fluid container.

According to one embodiment, the present apparatus provides a universally sized fluid barrier for drinking glasses, such as traditional long stem wine glasses, tumblers, sifters, goblets, brandy glasses, etc. The universally sized fluid barrier inserts into a glass and adhesively seals onto the glass's rim or internal or external side wall. The fluid barrier has a stepped conical shape for various glass openings which prevents the beverage from escaping or being extracted, while permitting the aroma of the beverage to pass through.

According to one embodiment, a sensory aroma glass can be sealed for a prefilled beverage product.

When a fluid container and fluid barrier are used in combination, the combination is referred hereinafter as a sensory aroma glass.

FIG. 1A illustrates a side view of a sensory aroma glass, according to one embodiment. Preferably, a fluid container 40 with a fluid barrier 41 is molded from a single piece of material. Alternatively, the fluid container 40 and fluid barrier 41 are two separate pieces that are welded together to form a single piece; a sensory aroma glass. The conical shape of the fluid barrier 41 prevents consumption of the liquid contents of the fluid container 40. The bottom 22 of the fluid barrier 41 may be open or partially covered to allow the aroma to escape and is shown in greater detail in FIGS. 2A-C. According to one embodiment, the fluid container 40 has a fill-mark 43 which indicates the maximum level at which the fluid container 40 may be filled in order for the fluid barrier 41 to function properly.

FIG. 1B illustrates a perspective view of sensory aroma glass in practice, according to one embodiment. The sensory aroma glass is shown tilted at such an angle that liquid contents 49 would escape from a conventional drinking glass. The conical shape of the fluid barrier 41 prevents consumption of the liquid contents 49 of the fluid container 40 by trapping the liquid contents 49 between the outer wall 45 of the fluid barrier 41 and the internal side wall 47 of the fluid container 40 when tipped in any direction and at any angle. The fluid barrier 41 prevents the liquid contents 49 from escaping even if the fluid container 40 is turned completely upside down. As shown in this exemplary illustration, the bottom 22 of the fluid barrier 41 is partially covered by a sieve type cover to prevent extraction of liquid contents 49. According to one embodiment, the fluid container 40 has a fill-mark 43 which indicates the maximum level at which the fluid container 40 may be filled in order for fluid barrier 41 to function properly.

Figure 2A:
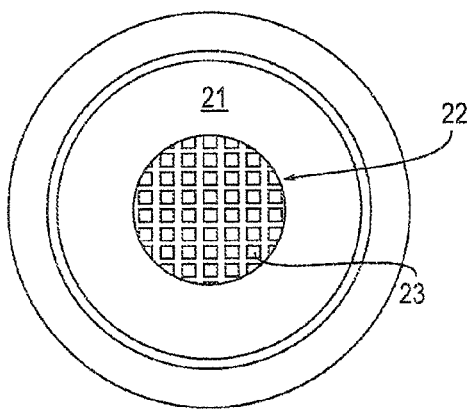
FIG. 2A illustrates a top view of a fluid barrier with a sieve type bottom cover, according to one embodiment.
Figure 2B:
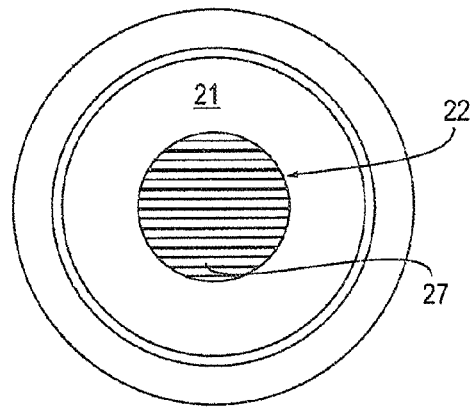
FIG. 2B illustrates a top view of a fluid barrier with a rail bottom cover, according to one embodiment.
Figure 2C:
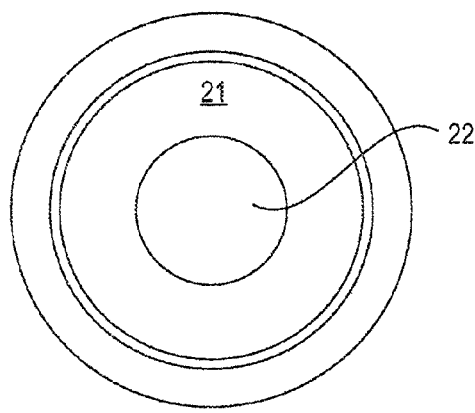
FIG. 2C illustrates a top view of a fluid barrier with an open bottom, according to one embodiment.

FIG. 2A illustrates a top view of a fluid barrier with a sieve type bottom cover, according to one embodiment. The bottom 22 of the fluid barrier 21 is flat with small holes 23 (sieve type cover) which allows aroma vapor to escape but prevents the beverage from escaping or being extracted (e.g. by way of a straw). The holes 23 should be sized and spaced such that the bottom 22 of the fluid barrier 21 is porous enough to permit the aroma of the liquid contents to pass through but impermeable enough that it is difficult to extract the liquid contents. FIG. 2B illustrates a top view of a fluid barrier with a rail bottom cover, according to one embodiment. Rather than a sieve type cover, the bottom 22 of the fluid barrier 21 is partially covered by rails 27. Persons skilled in the art will recognize other designs that will achieve this end. FIG. 2C illustrates a top view of a fluid barrier with a bottom 22 that is completely open, according to one embodiment. The bottom 22 of the barrier 21 is left open to allow for maximum aromatization.

Figure 3:
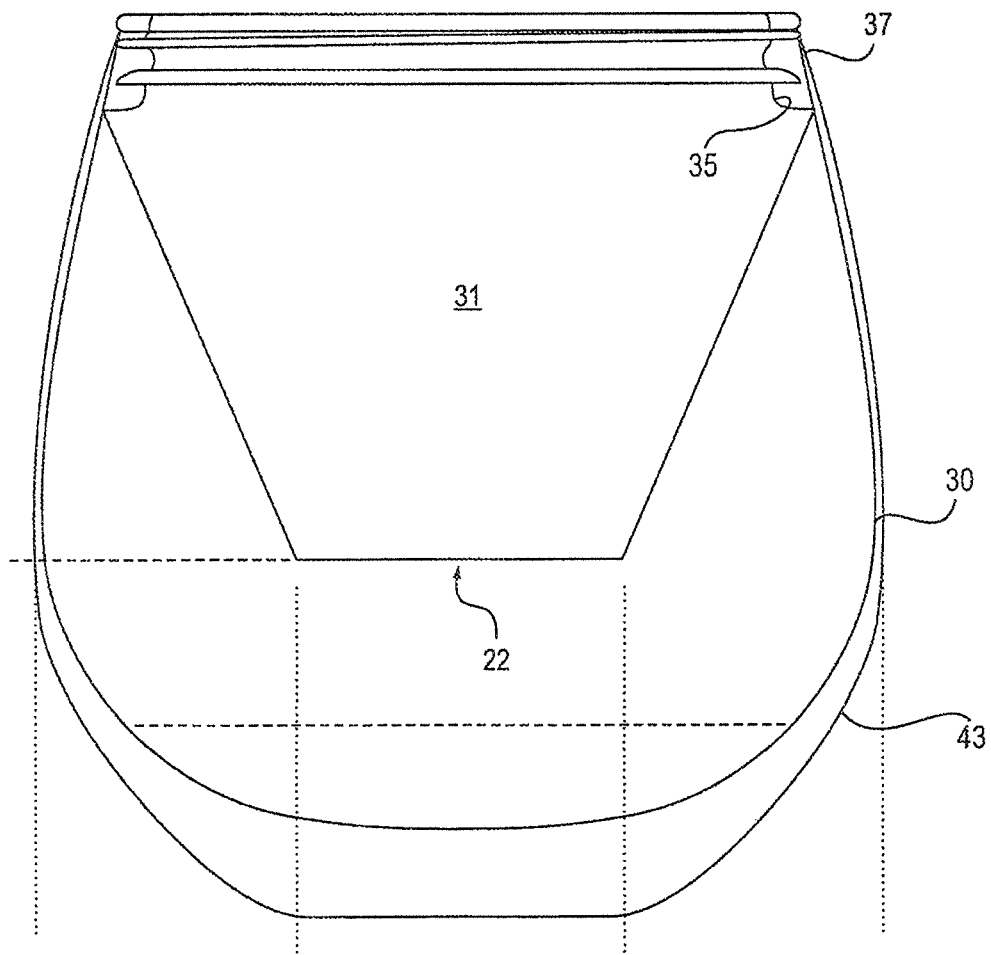
FIG. 3 illustrates a side view of an attachable and detachable fluid barrier, according to one embodiment.

FIG. 3 illustrates a side view of an attachable and detachable fluid barrier, according to one embodiment. The fluid barrier 31 and fluid container 30 are part of a set. The fluid barrier 31 is conical in shape and attaches to the fluid container 30. According to one embodiment, the fluid barrier 31 and the fluid container 30 are both threaded 35 and 37 such that the fluid barrier 31 screws into the fluid container 30. Persons skilled in the art will recognize other ways of making fluid barrier 31 attachable to fluid container 30. According to the preferred embodiment, the fluid container 30 is reusable while the fluid barrier 31 is reusable or disposable. Once attached to the fluid container 30, the conical shape of the fluid barrier 31 seals and prevents consumption of liquid contents in the fluid container 30. The bottom 22 of the fluid barrier 31 may be open or partially covered and is shown in greater detail in FIGS. 2A-C. According to one embodiment, the fluid container 30 has a fill-mark 43 which indicates the maximum level at which the fluid container 30 may be filled in order for the fluid barrier 31 to function properly.

Figure 4:
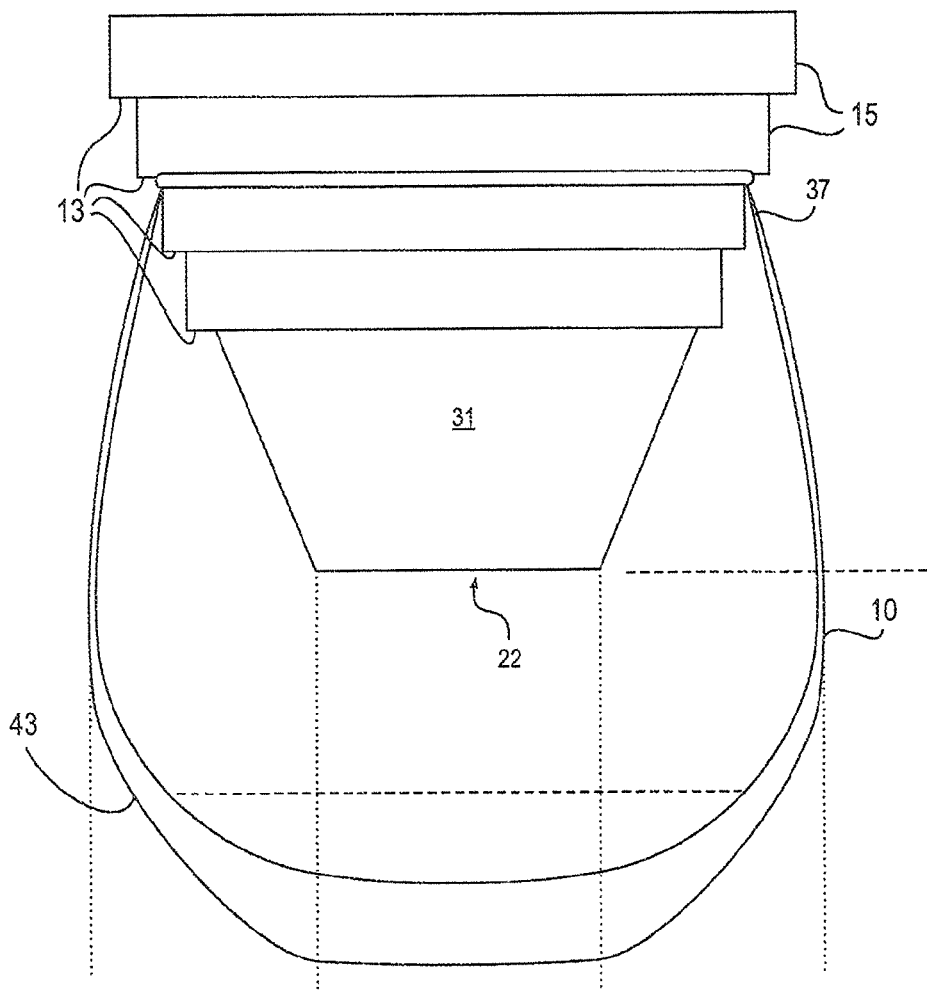
FIG. 4 illustrates a side view of a fluid barrier inserted into a glass, according to one embodiment.

FIG. 4 illustrates a side view of a fluid barrier inserted into a glass, according to one embodiment. The fluid barrier 31 has a stepped conical shape so that it can fit a variety of glass shapes and sizes. A wine glass 10 is shown in FIG. 4 but the barrier 31 is intended for use with any glass or cup shape. The steps 15 of fluid barrier 31 have a layer of adhesive 13 so that the barrier 31 can bond with the rim or internal or external side wall of the glass 10. Once adhesively sealed to a glass, the conical shape of the fluid barrier 31 prevents consumption of the contents of the glass 10. The bottom 22 of the fluid barrier 31 may be open or partially covered to allow the aroma to escape and is shown in greater detail in FIGS. 2A-C. According to one embodiment, the glass 10 has a fill-mark 43 which indicates the maximum level at which the glass 10 may be filled in order for fluid barrier 31 to function properly.

Figure 5:
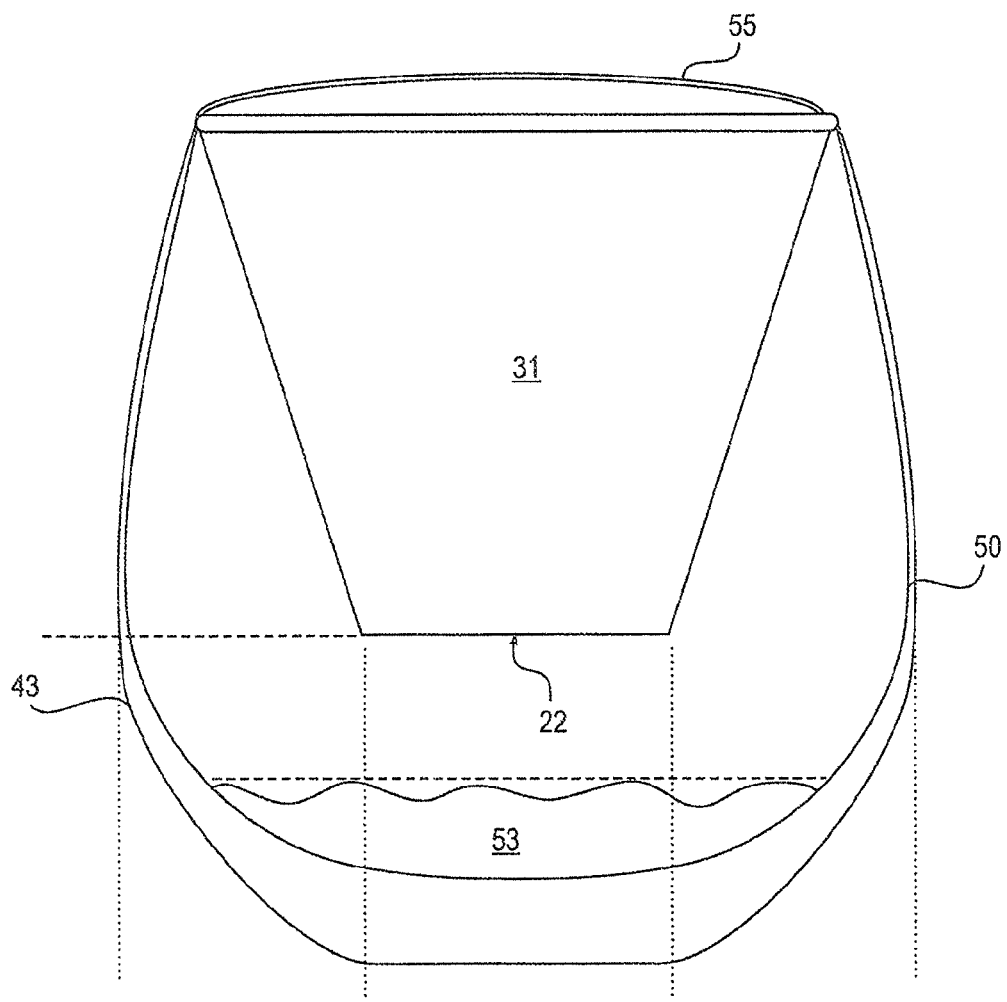
FIG. 5 illustrates a side view of a sensory aroma glass sealed with prefilled beverage product.

FIG. 5 illustrates a side view of the sensory aroma glass sealed with prefilled beverage product. According to this embodiment, the sensory aroma glass 50 is sealed with a removable or breakable seal 55 for prefilled beverage product 53. Those skilled in the art will recognize different methods and materials for sealing a sensory aroma glass 50.

Preferably, the material used to construct the apparatus is clear so that the liquid contents can be seen at the same time as the aroma is sampled; however, this is not a requirement. The apparatus may be constructed of glass, polymers, including, but not limited to polyethylene terephthalate (PET), high density polyethylene (HDE), polyvinyl chloride (PVC), low density polyethylene (LDPE), polypropylene (PP), polycarbonate, aluminum, paper based material or composite material. These are few examples of materials that may be used and are not intended as an exhaustive list. Those skilled in the art will recognize other materials for construction of the present apparatus.

There are a variety of methods in which the apparatus may be implemented. According to one embodiment, the fluid container and fluid barrier are manufactured as separate pieces. A fluid container is fitted with a fluid barrier after the beverage product is portioned into the fluid container. For example, at the promotion location. As described above, the fluid barrier may be universally sized for any drinking glass, or come as part of a fitted fluid container/barrier set. Further, either the fluid barrier or fluid container may be reusable or disposable. According to another embodiment, a fluid container and a fluid barrier are manufactured as a single piece. For instance, the fluid container and fluid barrier may be manufactured as two pieces that are later welded or bonded together to form a single piece; a sensory aroma glass. According to this embodiment, the sensory aroma glass may be prefilled with beverage product, or the beverage product may be portioned into the sensory aroma glass on site.

Figure 6:
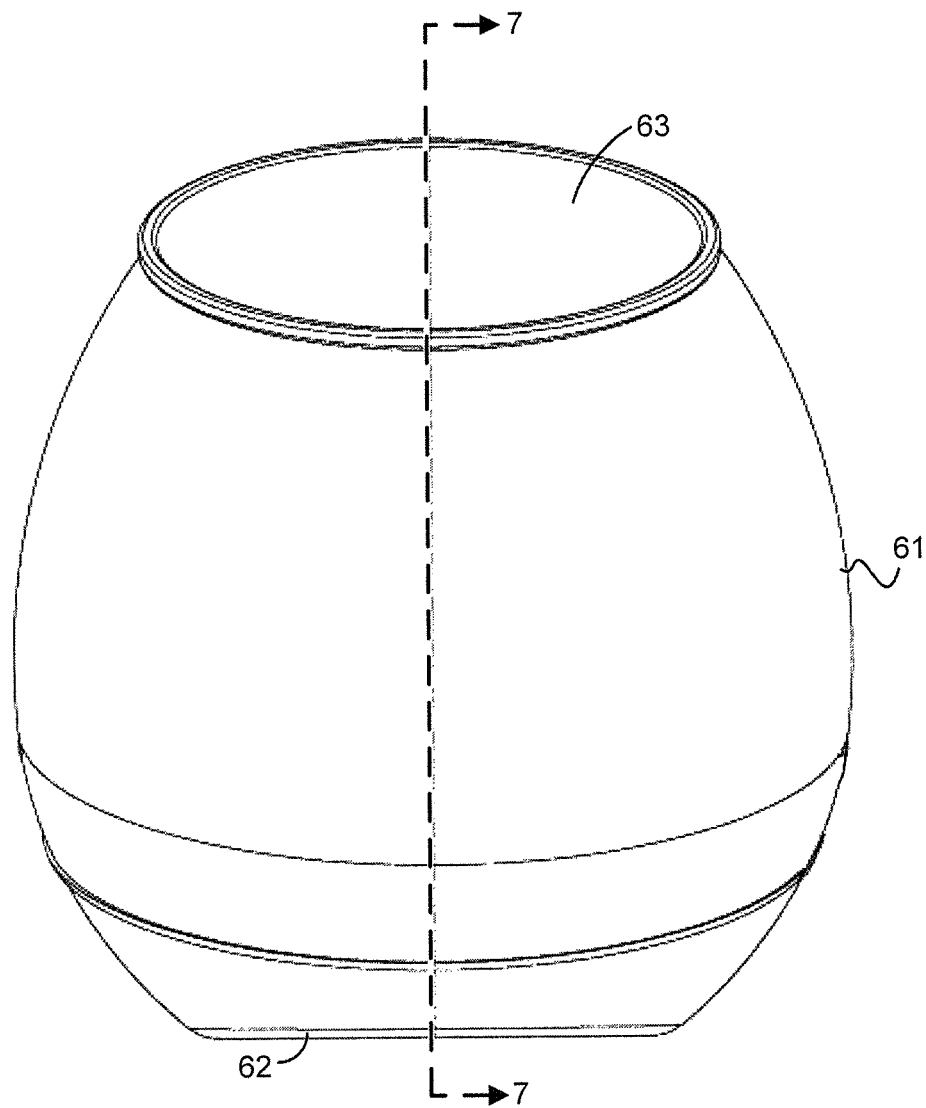
FIG. 6 illustrates a front view of a fluid barrier inserted into a tilted fluid container, according to one embodiment.

FIG. 6 illustrates a front view of a fluid barrier inserted into a tilted fluid container, according to one embodiment. A fluid container 61 includes an opening 63 so that an aroma of contents within the fluid container 61 can escape through the opening 63. When the fluid container 61 is placed on a surface (e.g., a table surface) such that a base 62 of the fluid container 61 is in contact with the surface, the fluid container 61 is tilted at an angle to the surface. The tilted fluid container 61 allows the escaping aroma of the contents to be directed towards a user who may be adjacent to the opening 63 of the fluid container 61. A cross-sectional view of the fluid container 61 is illustrated in FIG. 7, as indicated by the dotted line path 7.

Figure 7:
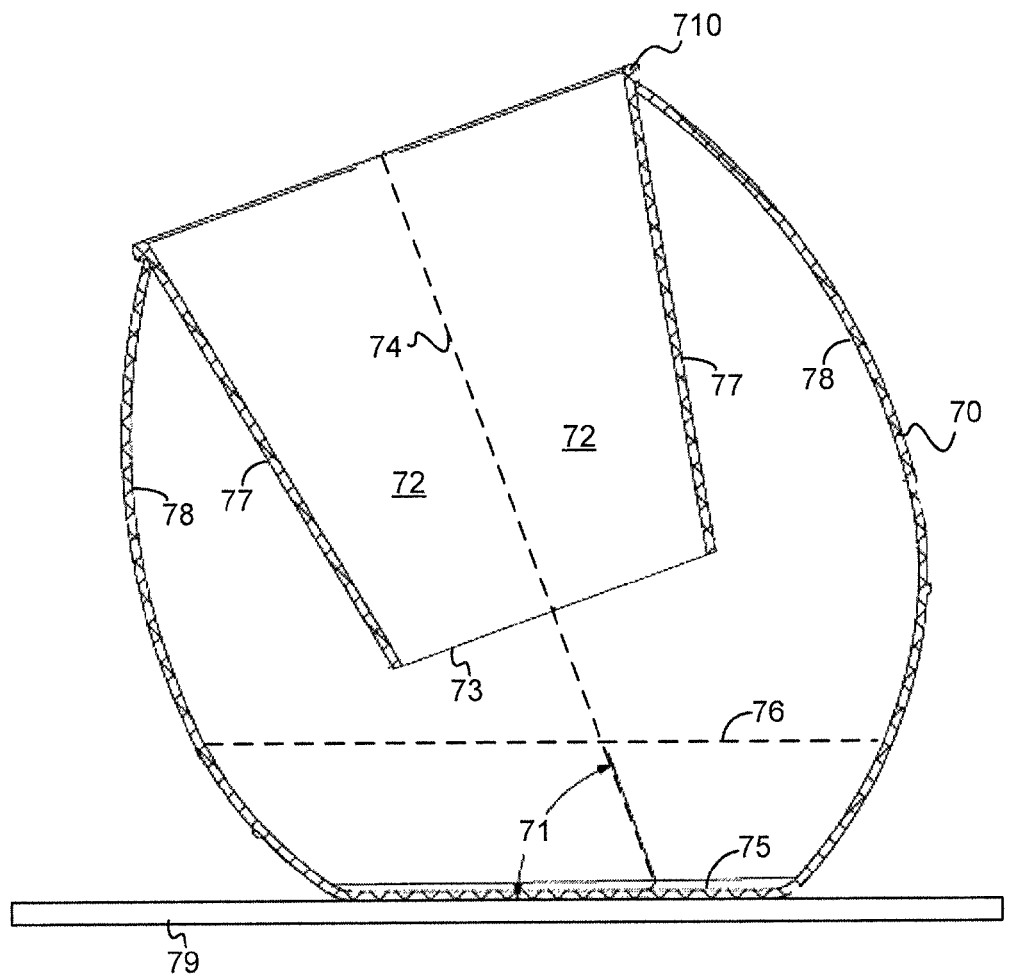
FIG. 7 illustrates a cross-sectional view of a fluid barrier inserted into a tilted fluid container, according to one embodiment.

FIG. 7 illustrates a cross-sectional view of a fluid barrier inserted into a tilted fluid container, according to one embodiment. A fluid container 70 with a fluid barrier 72 may be molded from a single piece of material. In another embodiment, the fluid container 70 and the fluid barrier 72 are two separate pieces that are welded together to form a single piece. The fluid container 70 includes a fill line 76. The conical shape of the fluid barrier 72 prevents the contents within the fluid container 70 from escaping through the opening of the fluid barrier 72 when the fluid container 70 is tipped in any direction and at any angle, provided that the contents are filled at or below a maximum level indicated by the fill line 76. The conical shape of the fluid barrier 72 prevents consumption of the contents in the fluid container 70 by trapping the contents between the outer wall 77 of the fluid barrier 72 and the internal side wall 78 of the fluid container 70 when the fluid container 70 is tipped in any direction and at any angle. The fluid container 70 includes a base 75 that is at an angle 71 to the longitudinal axis 74 of the fluid container 70. When the fluid container 70 is placed on a surface 79 (e.g., a table surface) such that the base 73 of the fluid container 70 is parallel to and in contact with the surface 79, the fluid container 70 is tilted at the angle 71 to the surface 79. The rim 710 and the base 73 of the fluid container 70 lie on intersecting planes. The bottom 73 of the fluid barrier 72 may be open or partially covered to allow the aroma of the contents within the fluid container 70 to escape. The tilted fluid container 70 allows the escaping aroma of the contents to be directed towards a user who may be adjacent to the opening of the fluid container 70.

Figure 8A:
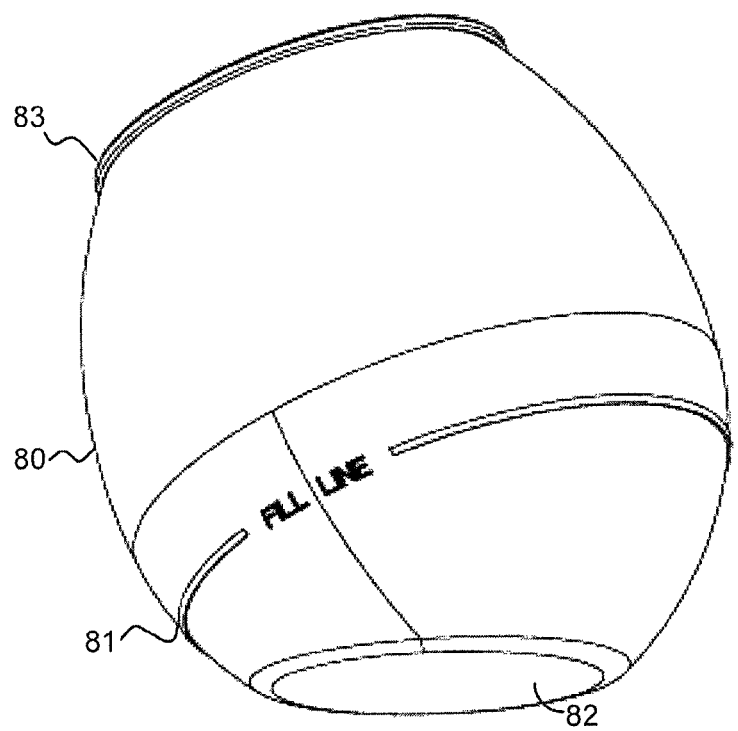
FIG. 8A illustrates a side view of a fluid barrier inserted into a tilted fluid container, according to one embodiment.
Figure 8B:
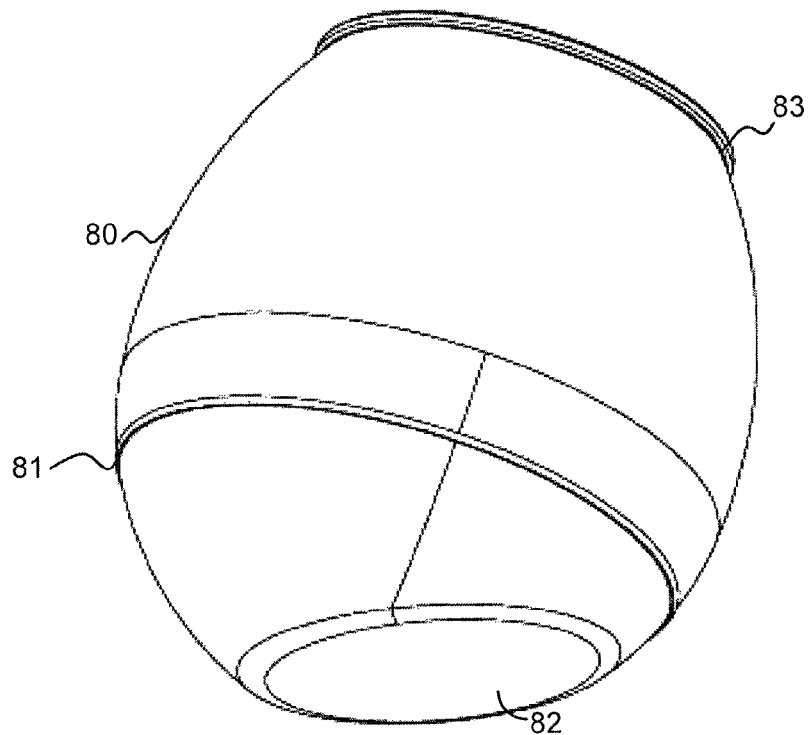
FIG. 8B illustrates another side view of a fluid barrier inserted into a tilted fluid container, according to one embodiment.

FIGS. 8A-8B illustrate side views of a fluid barrier inserted into a tilted fluid container, according to one embodiment. A fluid container 80 may include the conical fluid barrier 72 as illustrated in FIG. 7. The fluid container 80 includes a fill line 81 that indicates a maximum level at which the fluid container 80 may be filled in order to prevent the contents in the fluid container 80 from escaping through the opening of the conical fluid barrier 72 when the fluid container 80 is tipped in any direction and at any angle. When the fluid container 80 is placed on a surface such that the base 82 of the fluid container 80 is parallel to and in contact with the surface, the fluid container 80 is tilted at an angle to the surface. The rim 83 and the base 82 lie on intersecting planes. Tilting the fluid container 80 directs the escaping aroma of the contents towards a user who may be adjacent to the opening of the fluid container 80.

Figure 9:
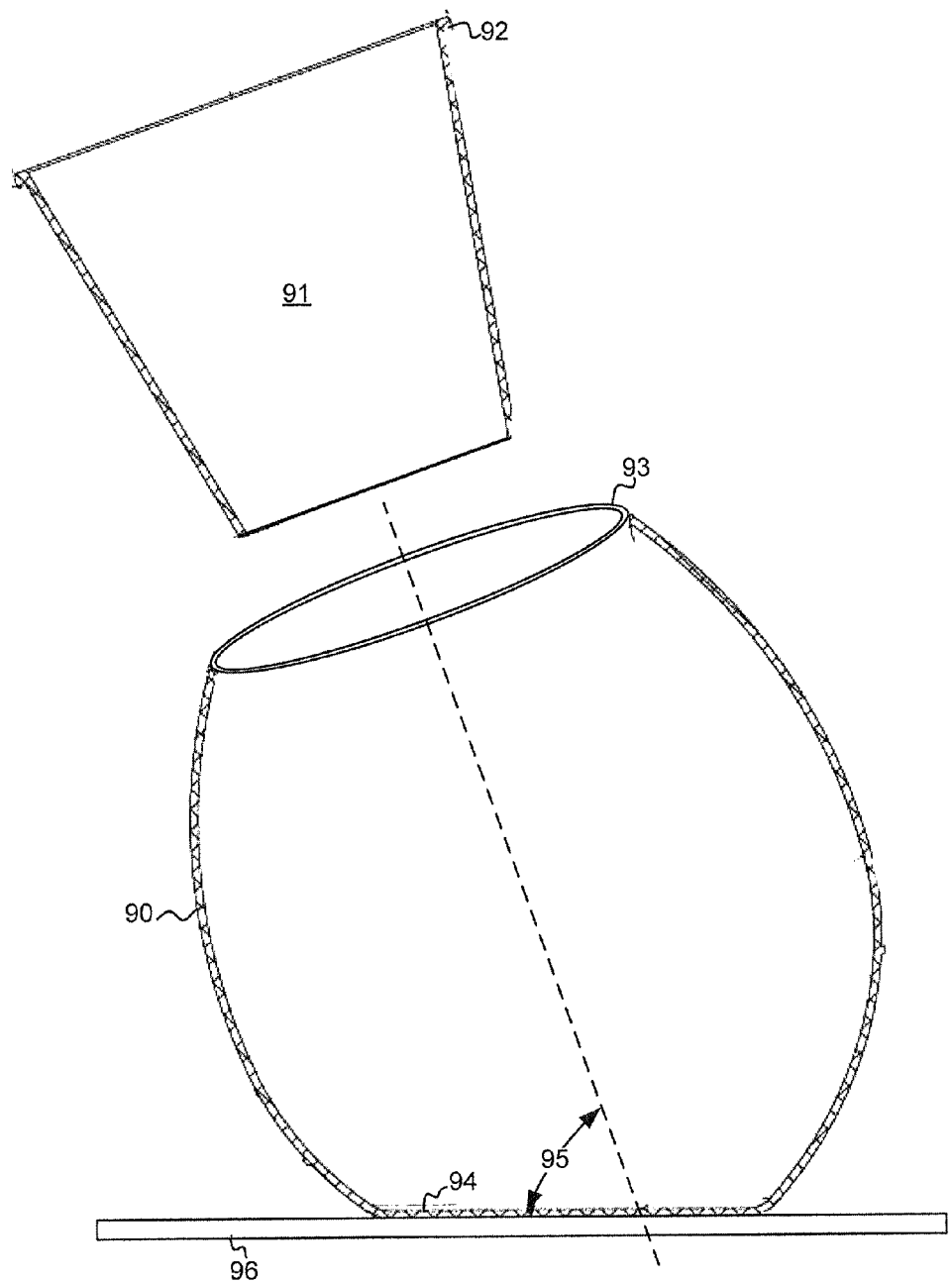
FIG. 9 illustrates an exemplary diagram of a fluid barrier that may be inserted into a tilted fluid container, according to one embodiment.

FIG. 9 illustrates an exemplary diagram of a fluid barrier that may be inserted into a tilted fluid container, according to one embodiment. When a fluid barrier 91 is fitted into a fluid container 90, an outer edge 92 of the fluid barrier 91 is in contact with a rim 93 of the fluid container 90. When the fluid container 90 is placed on a surface 96 (e.g., a table surface) such that the base 95 of the fluid container 90 is parallel to and in contact with the surface 96, the fluid container 90 is tilted at an angle 95 to the surface 96. The rim 93 and the base 95 of the fluid container 90 lie on intersecting planes.

A tilted sensory aroma glass has been described. It is understood that the embodiments described herein are for the purpose of elucidation and should not be considered limiting the subject matter of the disclosure. Various modifications, uses, substitutions, combinations, improvements, methods of productions without departing from the scope or spirit of the present disclosure would be evident to a person skilled in the art.

We claim:

1. An apparatus, comprising:
a fluid container having a rim and a base,
wherein the base is parallel to and in contact with a surface when the fluid container is placed on the surface; and
a fluid barrier having an outer edge to an opening,
wherein the outer edge of the fluid barrier is in contact with the rim of the fluid container,
wherein the opening at the outer edge of the fluid barrier is slanted with respect to the base of the fluid container,
wherein the fluid barrier extends into the fluid container, and
wherein the opening is configured to allow an aroma of a fluid in the fluid container to escape through the opening.

2. The apparatus of claim 1, wherein the fluid barrier has a conical shape that is configured to prevent the fluid that is below a fill line on the fluid container from escaping through the opening when the fluid container is tipped in any direction.

3. The apparatus of claim 1, wherein the fluid barrier has a stepped conical shape.

4. The apparatus of claim 1, wherein the opening includes a sieve cover.

5. The apparatus of claim 1, wherein the opening includes an inter-crossing rail cover.

6. The apparatus of claim 1, wherein the fluid container and the fluid barrier screw together.

7. The apparatus of claim 1, wherein the fluid container is prefilled with the fluid for aroma sampling and is vacuum sealed.

8. The apparatus of claim 1, wherein the fluid container allows contents inside the fluid container to be visually inspected from the outside.

9. The apparatus of claim 8, wherein the fluid container comprises transparent material.

10. The apparatus of claim 1, wherein the fluid barrier and the fluid container are molded from a single piece of material.

11. The apparatus of claim 1, wherein the fluid barrier and the fluid container are welded together to form a single piece.

12. An apparatus comprising:
a fluid barrier having an outer edge to an opening, wherein the outer edge of the fluid barrier has a layer of adhesive so that the outer edge of the fluid barrier can be fitted to bond with a rim of a fluid container having a base, wherein the outer edge of the fluid barrier is in contact with the rim of the fluid container, wherein the opening at the outer edge of the fluid barrier is slanted with respect to the base of the fluid container, wherein the fluid barrier extends into the fluid container, and wherein the opening is configured to allow an aroma of a fluid in the fluid container to escape through the opening.

13. The apparatus of claim 12, wherein the fluid barrier has a conical shape that is configured to prevent the fluid that is filled below a fill line on the fluid container from escaping through the opening when the fluid container is tipped in any direction.

14. The apparatus of claim 12, wherein the opening includes a sieve cover.

15. The apparatus of claim 12, wherein the opening includes an inter-crossing rail cover.

16. The apparatus of claim 12, wherein the fluid barrier has a stepped, conical shape to fit a variety of fluid container shapes and sizes.

17. The apparatus of claim 12, wherein the fluid barrier is fitted to bond with one of the rim and a side wall of the fluid container.

* * * * *